United States Patent [19]

Thompson

[11] Patent Number: 5,029,981
[45] Date of Patent: Jul. 9, 1991

[54] DIFFRACTION GRATING

[75] Inventor: George H. B. Thompson, Sawbridgeworth, England

[73] Assignee: STC PLC, London, England

[21] Appl. No.: 579,081

[22] Filed: Sep. 10, 1990

Related U.S. Application Data

[63] Continuation of Ser. No. 402,650, Sep. 5, 1989, abandoned.

[30] Foreign Application Priority Data

Sep. 17, 1988 [GB] United Kingdom ............... 8821898

[51] Int. Cl.$^5$ .................... G03B 21/56; G02B 6/10
[52] U.S. Cl. .......................... 350/162.23; 350/96.12
[58] Field of Search ........... 350/96.19, 162.22, 162.23, 350/96.13, 96.12, 162.24

[56] References Cited

U.S. PATENT DOCUMENTS 4,746,186  5/1988  Nicia .............................. 350/162.23
4,869,568  9/1989  Schimpe .......................... 350/96.13

OTHER PUBLICATIONS

Periodic Structures and Their Application in Integrated Optics, William S. C. Chang IEEE Transactions on Microwave Theory and Techniques, vol. MTT-21, No. 12, Dec. 1973.

Primary Examiner—Rodney B. Bovernick
Assistant Examiner—James Phan
Attorney, Agent, or Firm—Lee, Mann, Smith, McWilliams & Sweeney

[57] ABSTRACT

A one-dimensional reflective-type diffraction grating is formed in a slab waveguide by a one-dimensional array of wells formed with substantially perpendicular walls.

9 Claims, 4 Drawing Sheets

DIFFRACTION GRATING

This application is a continuation of application Ser. No. 402,650, filed Sept. 5, 1989, now abandoned.

BACKGROUND OF THE INVENTION

This invention relates to diffract gratings, and finds particular, but not necessarily exclusive, application in the field of optical transmission systems.

The channel capacity of an optical fibre transmission system can be greatly increased by using wavelength multiplexing in which many different signals are transmitted simultaneously along one fibre at different wavelengths. To achieve this, a satisfactory means must be provided at the transmitter end of a fibre link for combining the different optical wavelengths (multiplexing) and, at the far end of the fibre link, for separating them (demultiplexing). Multiplexing and demultiplexing may be achieved by means of channel dropping filters but a disadvantage of this approach, particularly where a large number of channels is involved, is that a separate filter is required for each channel at each end of the link. At optical frequencies an alternative to the channel dropping filter is the diffraction grating, one of whose advantages is that a single grating can be used for multiplexing an appreciable number of channels, and a second grating for demultiplexing them all. If the optical link is provided by an optical fibre waveguide, then the grating may conveniently be formed in a slab waveguide comprising a layer of dielectric material bounded by material of lower refractive index. Such a slab constitutes a one-dimensional waveguide, providing a waveguiding effect normal to the plane of the slab, but, unlike conventional two-dimensional waveguides, does not confine light propagating in the slab to any particular path within the slab.

A reflective type one-dimensional diffraction grating can be made in a slab waveguide by providing one edge of the waveguide with an array of reflecting facets. In the case of a conventional two-dimensional reflection-type diffraction grating the light is propagating in air when it is incident upon the grating facets, and these facets are typically made of metal or are metallized in order to make them sufficiently reflecting. In the single dimensional slab waveguide diffraction grating metallisation is not required because the light is propagating in the material of the slab waveguide when it is incident upon the grating facets, and hence, by using a sufficiently large angle of incidence, advantage can be taken of the phenomenon of total internal reflection. The advantage of making use of total internal reflection is that it does not exhibit the absorption characteristic of reflection at a metal surface, and nor is the amplitude of the reflection sensitive to the plane of polarisation of the incident light. For a slab waveguide made of semiconductive material, such as silicon or InGaAsP, the relatively high refractive index provides total internal reflection at a semiconductor/air interface for angles of incidence greater than about 20°.

For a wavelength multiplexed optical transmission system the grating must provide adequate resolution to discriminate between adjacent channels, and it must also avoid introducing significant additional optical loss into the transmission path. In the case of a slab waveguide grating it is also beneficial to design it in such a way as to minimize the optical path length between the object, the grating and the diffracted image because this also minimizes the effects of any non-uniformity in the slab waveguide that produces distortion of the optical wavefront. Path lengths in the collimating sections of such gratings tend to be proportional to the projected length of the grating in the direction normal to the direction of illumination, whereas the resolution of the grating is approximately proportional to its projected length in the direction parallel with the direction of illumination. Thus to reduce the path length while still achieving adequate resolution generally involves orienting the grating so that light is incident upon it at a considerable angle of incidence, typically 45° or more. This requirement, and the need to blaze the grating so that the input and output beams are inclined to each other by an angle at least twice as great as the critical angle, can be met in a format of one-dimensional diffraction grating that is fabricated in slab waveguide and is derived from the format of a conventional reflection type two-dimensional diffraction grating, and such a format has been described by S. Valette et al. in a paper entitled "New Integrated Optical Multiplexer Demultiplexer Realised on a Silicon Substrate", Proceedings of the 4th European Conference on Integrated Optics (ECIO'87) 11th–13th Nov '87 (Ed. CDW Wilkinson, J. Lamb—Publ. SETG).

This format is illustrated in FIG. 1 of the accompanying drawings, and from this figure it can be seen that the combination of a considerable angle of inclination of the grating with the need to separate the input and output beams by at least twice the critical angle detracts considerably from the efficiency of the grating. FIG. 1 is a planar view of a slab waveguide 10 provided with an aperture 11, extending with perpendicular walls, through the whole thickness of the waveguide.

The wall which forms the grating is serrated with a pitch 'd' being composed of a set of facets 12 separated by the members of a second set of facets 13. Light is arranged to be incident upon the grating at an angle 'I' and the grating is blazed so that the reflecting facets of the grating facets 12, are inclined at an angle $\theta$ to the direction of the grating. The incident light strikes each reflecting facet at an angle of incidence $\phi$ (where $I+\phi=\theta$) so that the diffracted light which is specularly reflected by each facet is inclined to an angle $2\phi$ to the incident light. If it were not for the need to exceed the critical angle for total internal reflection, $\phi$ could be zero, in which case the grating would be the slab waveguide equivalent of an echelon grating which in principle can approach 100% efficiency because every part of the incident beam is reflected by one of the reflecting facets. In this instance however $\phi$ cannot be zero, and the result is that a proportion of the incident light is lost through being scattered or diffracted into unwanted orders of being incidentally directly upon the facets 13 or, if those facets are differently oriented, through being incident upon them after reflection in the facets 12. From geometrical considerations it can be seen that if $\theta=45°$ and $\phi=20°$ the loss in efficiency is over 6 dB. (If the direction of the light is reversed the efficiency loss through this particular form of unsatisfactory illumination occasioned because the facets 13 are in the shadow of their adjacent facets 12 is avoided, but the place of this loss mechanism is taken by another, namely the diffraction loss into unwanted orders resulting from the fact that the reflected light is divided into separated bands as it leaves the grating.)

SUMMARY OF THE INVENTION

This invention is directed to a design of one-dimensional diffraction grating capable of affording improved efficiency.

According to the present invention there is provided a reflective type diffraction grating formed in a slab waveguide, the diffracting elements of which diffraction grating are formed by reflecting facets provided by walls of a line of discrete apertures or wells formed in the slab waveguide which walls extend substantially perpendicularly with respect to the plane of the slab waveguide.

BRIEF DESCRIPTION OF THE DRAWINGS

There follows a description of diffraction gratings embodying the invention in preferred forms. The description refers to the accompanying drawings in which.

DETAILED DESCRIPTION OF PREFERRED EMBODIMENTS

Figure 1:
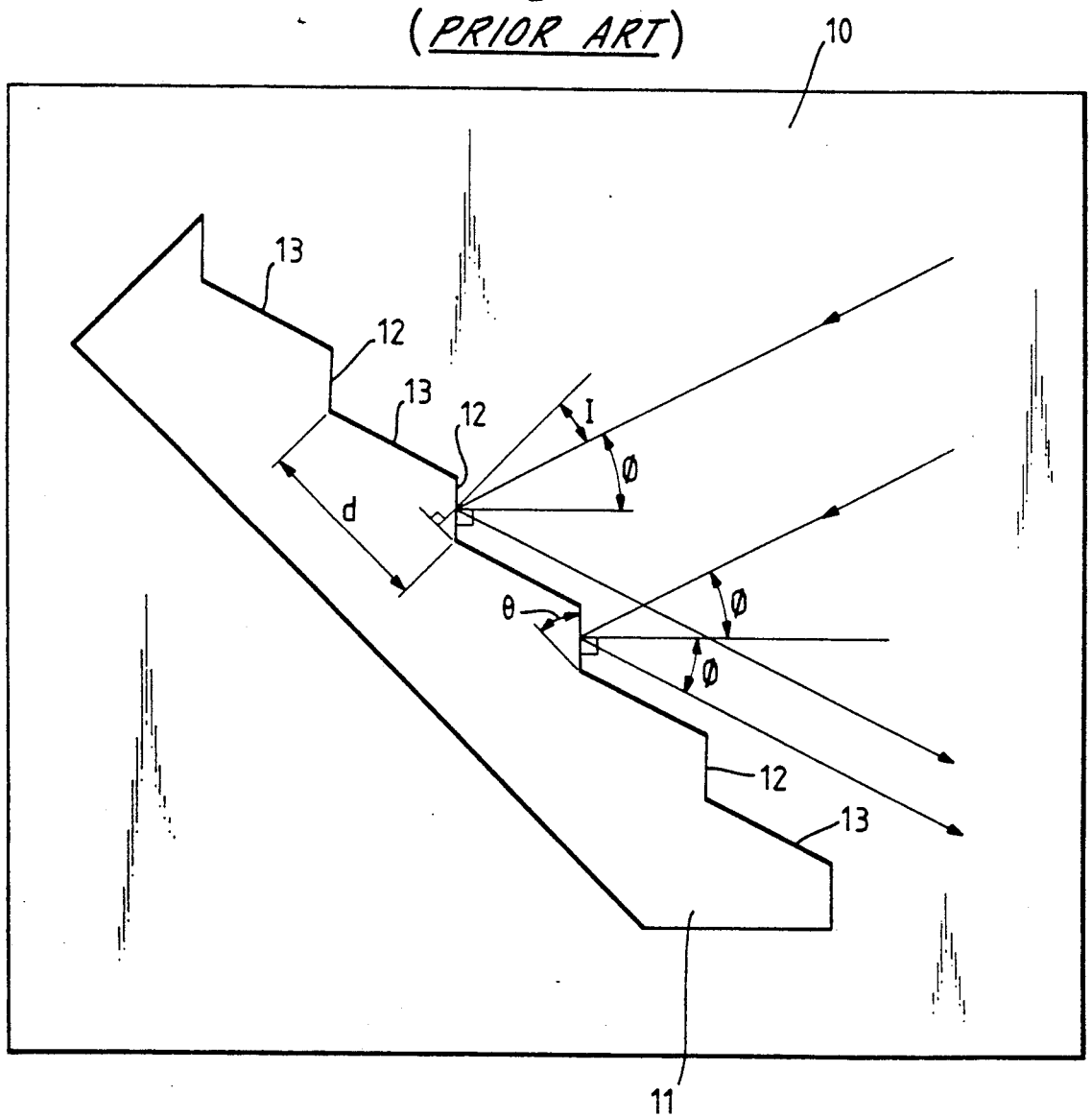
FIG. 1, to which previous reference has been made, depicts a planar view of a prior art one-dimensional diffraction grating.
Figure 2:
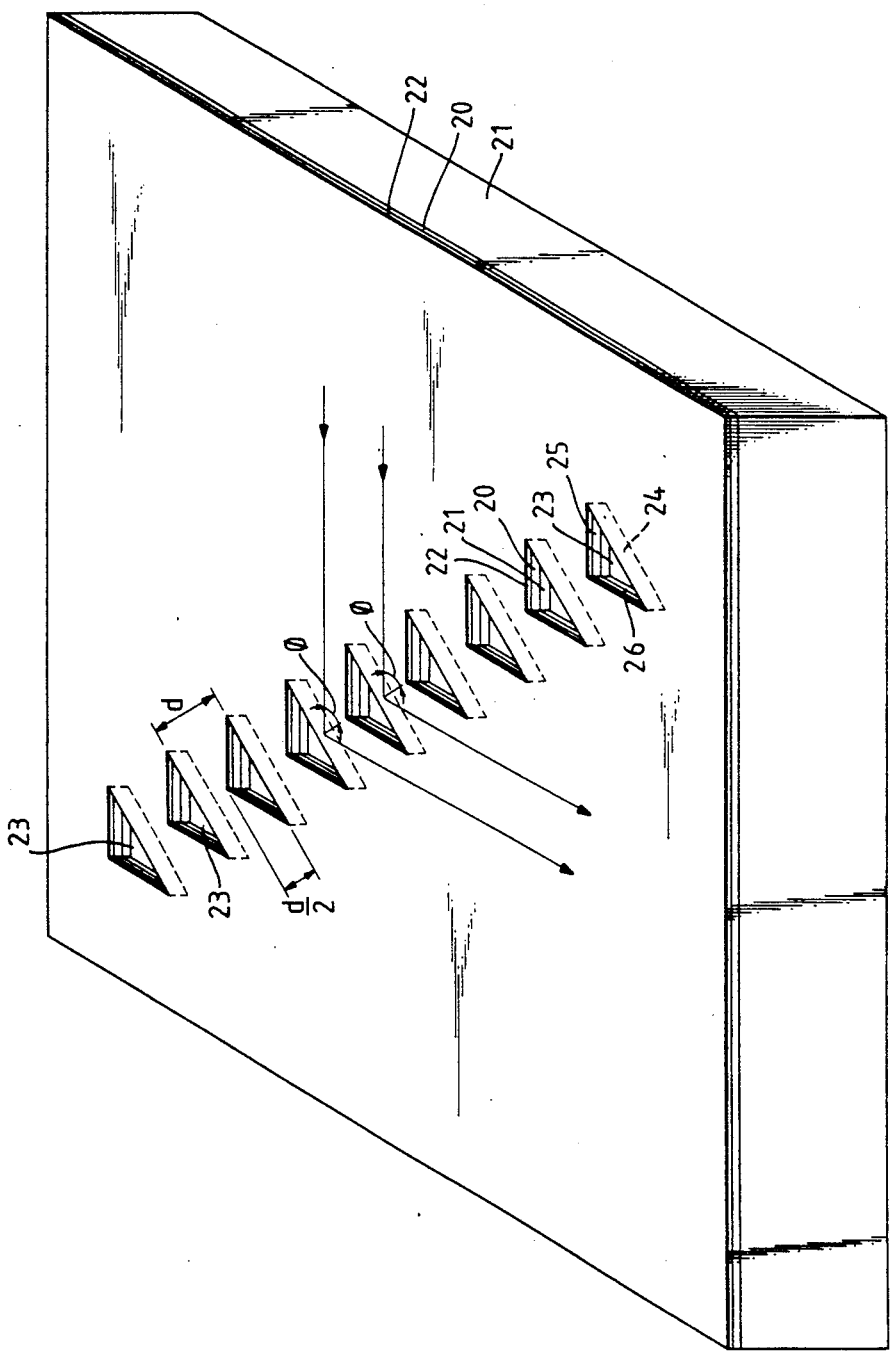
FIG. 2 depicts a perspective view of a one-dimensional diffraction grating embodying the present invention in a first preferred form.

Referring now to FIG. 2, a single mode slab waveguide is formed by a layer 20 bounded by material of lower refractive index constituted in part by a supporting substrate 21. The lower refractive index material above layer 20 may be constituted by a layer 22 of material deposited upon layer 20 or it may simply be constituted by the ambient. Semiconductor material, such as InGaAsP, is particularly appropriate for forming the waveguide because of its high refractive index, and hence relatively low critical angle, because it can simultaneously form the basis for injection laser sources and optical detectors, and because high quantity chemical vapour deposition methods of layer growth have been developed in semiconductor technology capable of providing layers with acceptable uniformity of composition and layer thickness. By making the thickness of layer 20 at least several wavelengths thick, typically at least five wavelength thick, one-dimensional reflecting components formed in the waveguide behave very similarly to the way two-dimensional equivalents behave in an unbounded medium.

Standard photolithographic techniques are used to etch a set of equispaced identical triangular cross-section wells 23 through layer 22 (if present), through layer 20, and into substrate 21. For illustrative convenience only nine wells have been shown in FIG. 2, but in practice a diffraction grating will normally have significantly more, typically in the range from about 50 to about 500. The perpendicular side walls 24 25 and 26 of each well define a triangular base to the well which is isosceles. The side wells 24 constitute the reflecting facets of the diffraction grating. They are aligned normally with respect to the linear extent of the grating and are arranged with a uniform spacing 'd', the grating period. In order to provide an angle of incidence $\phi$ upon the grating facets 24 for a collimated beam of light which will intercept the whole beam without any shadowing of any of the facets 24 by any of their neighbours, the isosceles triangle defined in the base of each well by the side walls has a height d/2. A smaller height is possible, or any other shape which has the same base and is contained within the d/2 height triangle, but would be associated with more complicated local edge effects on the beam propagating through the structure. The angle of incidence $\phi$ of the light upon the individual facets of the grating, which is also the angle between the direction of incidence of the light and the direction if the linear extent of the grating, can be arranged to assume any value below 90° that exceeds the critical angle.

The relation between the grating order N giving rise to specular reflection at the facets 24 and the grating pitch d is given by $$N\lambda_o = 2 \, n \, d \, \cos \phi$$

where $\lambda_o$ is the centre wavelength giving rise to the specular reflection, where n is the effective refractive index of the slab waveguide and $\phi$ is the angle of incidence upon the facets 24 of the collimated light. The grating order N must be restricted not only so that there is no overlap of the orders over the wavelength band prescribed but also to prevent the grating efficiency dropping off at the spectral edges due to the narrow angle of the far field of the reflection from individual grating facets 24 at high grating orders. The criteria for meeting both requirements is $N < \lambda/\Delta\lambda$ where $\Delta\lambda$ is the spectral width. In theory there is a reduction in signal of about 4 dB when $N = \lambda/\Delta\lambda$, whereas this value is reduced to only about 1 dB when $N = \lambda/2\Delta\lambda$. Thus for a bandwidth of about 5% this source of loss is kept to no more than about 1 dB for a grating order N of up to about 10. Assuming a value of 3.3 for the effective refractive index of the slab waveguide, a value of 45° for the angle of incidence $\phi$, and a value of 1.5 $\mu$m for the centre wavelength $\lambda_o$, it is seen that a grating order N = 10 is provided with a grating period $d \approx 3.2$ $\mu$m.

Figure 3:
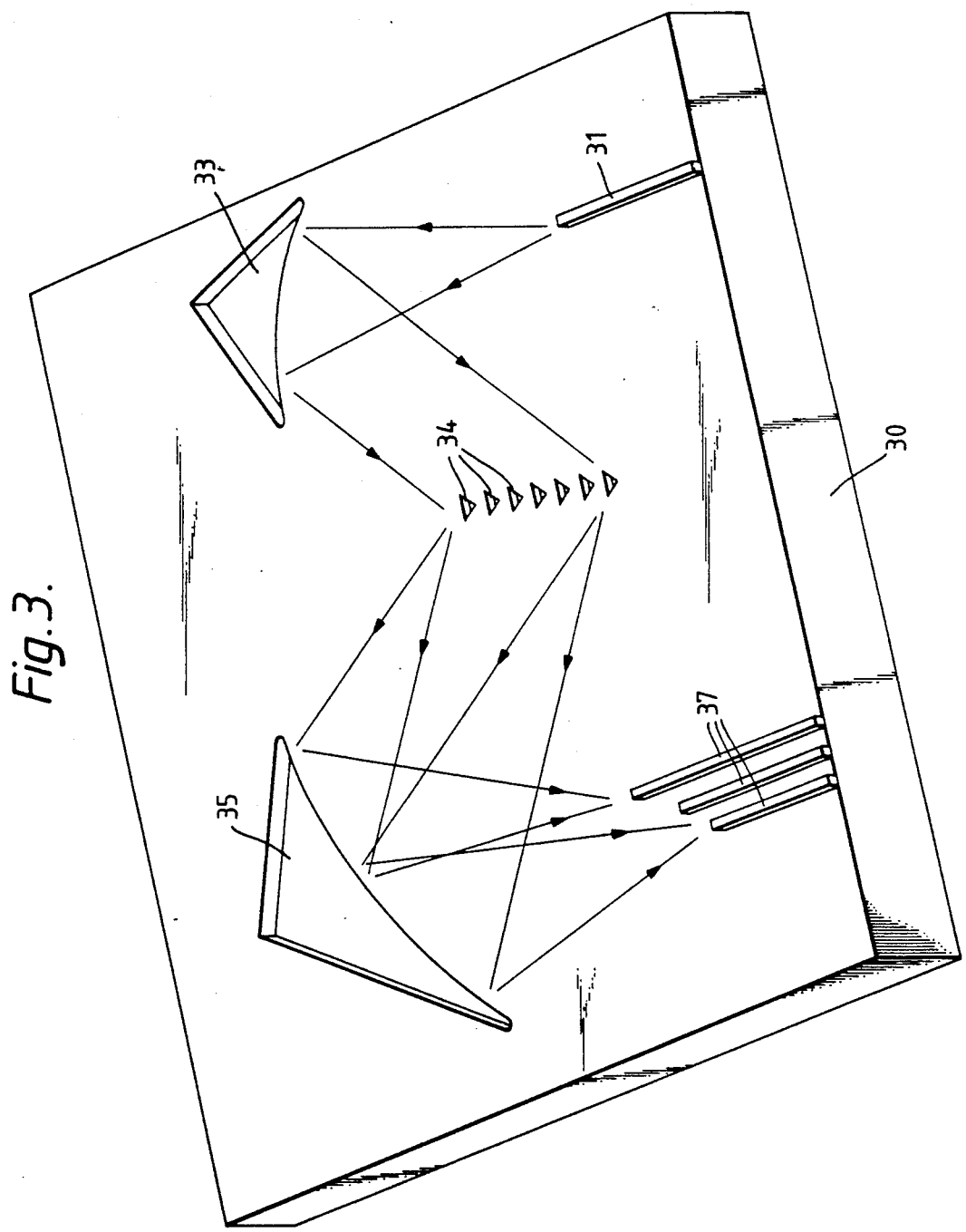
FIG. 3 depicts a multiplexer/demultiplexer employing a diffraction grating of the general form depicted in FIG. 2
Figure 4:
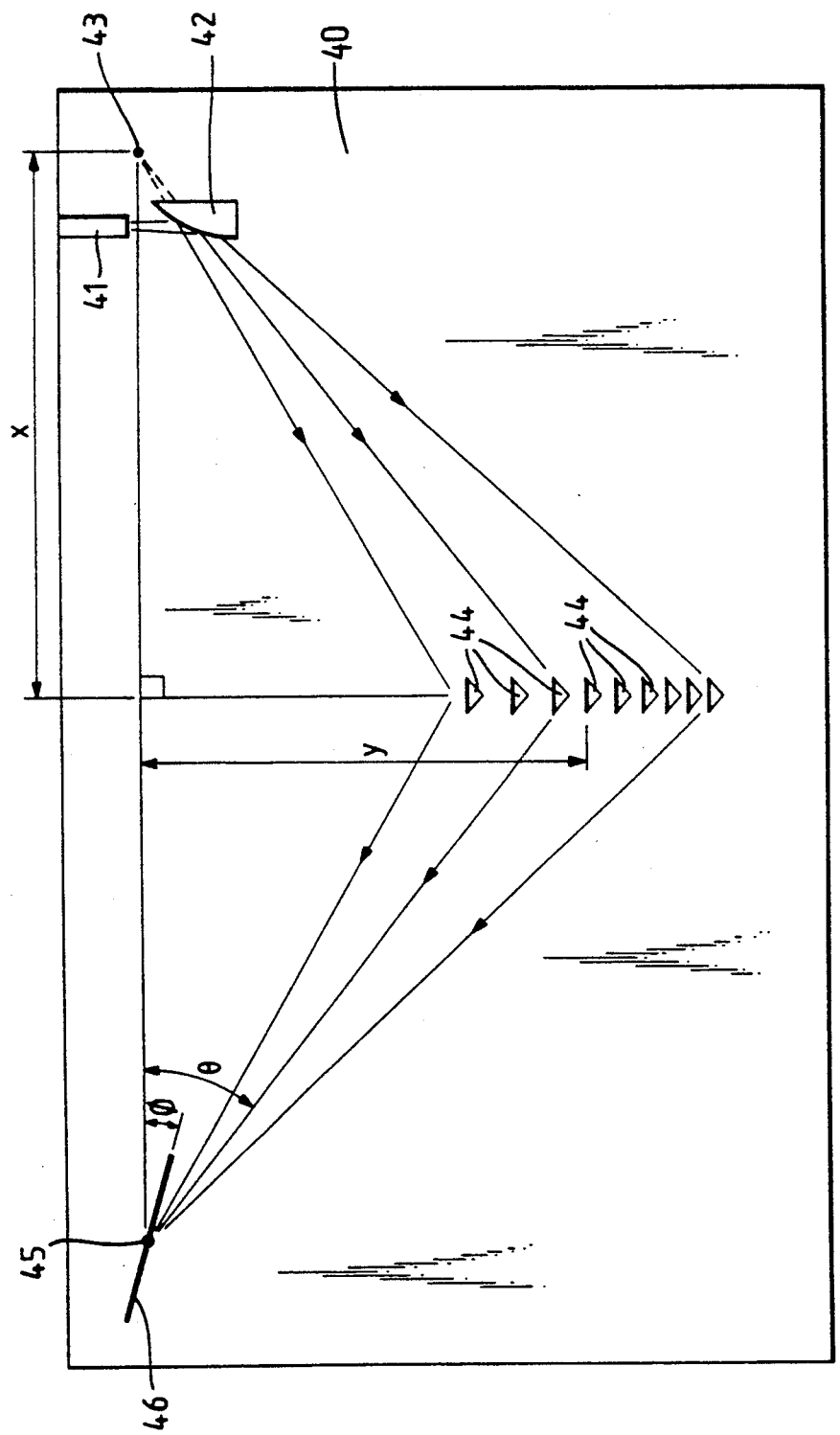
FIG. 4 depicts a multiplexer/demultiplexer distinguished from that of FIG. 3 in that it employs a chirped grating.

The facets 24 of the grating of FIG. 2 are uniformly spaced and so need to be illuminated with a collimated beam of light propagating in the slab waveguide. One way of producing this collimated light beam is to provide a monolithic structure, for instance as depicted in the demultiplexer of FIG. 3, in which light beam emerging for instance from the end of an optical fibre (not shown) is directed into the slab waveguide in which it is directed to a two-element beam expanding and collimated system of one-dimensional reflectors before reaching the grating elements. In the demultiplexer of FIG. 3 a single mode slab waveguide and its supporting substrate is depicted at 30. A short length of two-dimensional waveguide is created in the slab waveguide by means of an overlying dielectric rib 31. The outer end of this rib terminates at one edge of the slab waveguide 30, and light is launched into the underlying two-dimensional waveguide to emerge from its end underlying the inner end of the rib 31. From here it is directed to a concave mirror formed by the curved side wall of a well 33, and the light reflected by this well continues as a collimated beam directed at the diffraction grating constituted by a set of wells 34 corresponding to the wells 23 of FIG. 2. Here also, and again in FIG. 4, for illustrative convenience the number of grating elements represented is liable to be much smaller than is likely to be actually employed in practice. The diffracted light is intercepted by a second concave mirror constituted by the curved side wall of a well 35 and directed to a set of two-dimensional waveguides that are formed by a set of dielectric ribs 37 (three are illustrated) and terminate at a side edge of the slab waveguide. The mirrors of wells 33 and 35 are inclined to the incident light sufficiently to provide total internal reflection. If the direction of the passage of light through the device is reversed, then it functions as a multiplexer rather than as a demultiplexer. When the device is used as a demultiplexer the set of two-dimensional waveguides may be dispensed with and its place taken by an array of photodetectors (not shown) formed integrally with the slab waveguide.

In suitable circumstances a saving of space, and hence a relaxation of the tolerances imposed on the slab waveguide in order to reduce aberrations to an acceptable value, may be achievable in a multiplexer or demultiplexer by changing from a grating with a uniform spacing of grating elements to a chirped grating so as to be able to illuminate the grating with divergent light rather than with a collimated beam. A demultiplexer incorporating a chirped grating of this type is deposited in FIG. 4. Light is launched into the demultiplexer by way of a two dimensional waveguide formed in a single mode slab waveguide 40 by the presence of an overlying dielectric rib 41. Light emerging from the inner end of this waveguide is directed to a concave mirror formed by the curved side wall of a well 42 formed in the slab waveguide 40. This mirror provides a virtual source at 43, and the reflected light strikes the elements of a chirped grating formed by the side wall reflecting facets of a set of wells 44. In this grating the grating period is reduced in the direction away from the incident beam so as to satisfy the relationship:

$$d_m = \{y^2 + (m\, N\lambda_o/\, 2n)^2 + m\, N\lambda_o(x^2+y^2)^{\frac{1}{2}}/n\}^{\frac{1}{2}} - y$$

where $d_m$ is the distance between the mth and the zeroth elements of the grating (m can be negative as well as positive); where x and y are the co-ordinates of the source point 43 measured relative to the zeroth element of the grating respectively perpendicular to the linear extent of the grating and in the direction of the linear extent; where $\lambda_o$ is the centre wavelength of the grating that provides a diffracted image at 45 of the source focus point 43 such that source 43 and image 45 are disposed symmetrically on either side of the grating; where N is the order of the grating, and where n is the effective refractive index of the slab waveguide 40.

Under the condition that m extends equally in the positive and negative integer ranges, the image plane is found to be inclined at an angle of $\phi$ to the base line joining source 43 to image 45 where $\phi$ is related to the angle $\theta$ of diffraction of the central wavelength light by $$\tan \phi = 2 \tan^3\theta / (3 \tan^2\theta + 1)$$

Because $\phi$ varies with $\theta$, a grating which subtends an appreciable angular spread at the image point produces an imperfect image for wavelengths sufficiently removed from the central value. This becomes important as the grating length, and therefore its potential resolution, increases. For high resolution the distance y must be increased more than in proportion to the length of the grating in order to reduce the subtended angle at the image in order to prevent image aberrations for degrading the performance. In view of this limitation a chirped grating of this kind is better suited to applications where the required resolution is relatively small.

In the image plane the now physically separated channels may be directed in separate two-dimensional waveguides (not shown) to points external of the slab waveguide. Alternatively individual photodetectors (not shown) formed integrally with the slab waveguide may be located at the image plane.

I claim:

1. A one-dimensional reflective type diffraction grating formed in a slab waveguide having a guide layer bounded on both sides by material of lower refractive index, the diffraction elements of which diffraction grating are formed by reflecting facets provided by walls of a line of discrete apertures or wells formed in the slab waveguide, which walls extend substantially perpendicularly with respect to the plane of the slab waveguide at least through the whole thickness of its guide layer so as to form facets that are substantially total internally reflecting in respect of light guided by the slab waveguide so as to be incident upon the facets at angles of incidence at least as great as the critical angle.

2. A diffraction grating as claimed in claim 1 wherein the diffracting elements are uniformly spaced.

3. A diffraction grating as claimed in claim 1 wherein the spacing of the diffracting elements is graded.

4. A diffraction grating as claimed in claim 1, wherein the slab waveguide is constituted by a layer of a first material, constituting the guide layer, supported upon an underlying substrate of a second material.

5. A diffraction grating as claimed in claim 4, wherein the diffracting elements are uniformly spaced.

6. A diffraction grating as claimed in claim 4 wherein the spacing of the diffracting elements is graded.

7. A diffraction grating as claimed in claim 1, wherein the slab waveguide is constituted by a layer of a first material, constituting the guide layer, sandwiched between an underlying substrate of a second material and a covering layer of a third material.

8. A monolithic optical frequency multiplexer/demultiplexer incorporating a reflective type diffraction grating as claimed in claim 1.

9. A monolithic optical frequency multiplexer/demultiplexer as claimed in claim 8 which includes, additional to the diffracting elements of the grating, at least one cylindrical mirror provided by a wall of an additional aperture or well formed in the slab waveguide, which wall extends substantially perpendicularly with respect to the plane of the slab waveguide.

* * * * *